Aug. 27, 1968  S. FIGAR  3,398,740
SENSING DEVICE FOR PLETHYSMOGRAPHIC APPARATUS
Filed Aug. 4, 1965  2 Sheets-Sheet 1

INVENTOR.
Štěpán Figar
BY

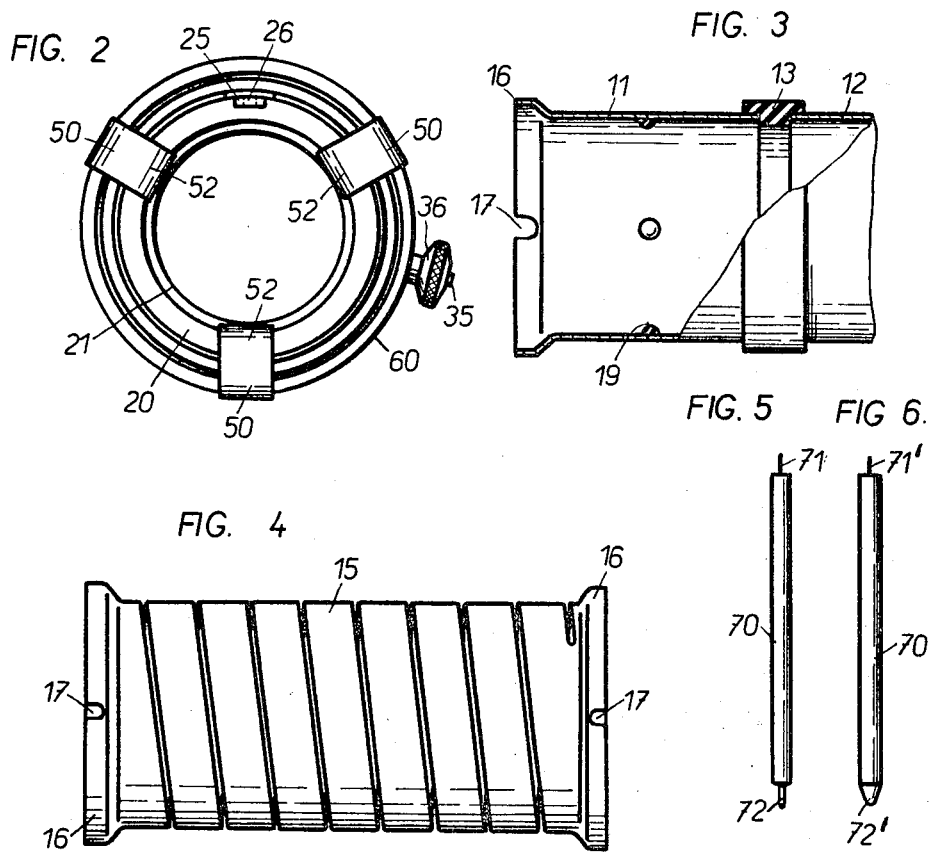

United States Patent Office
3,398,740
Patented Aug. 27, 1968

3,398,740
SENSING DEVICE FOR PLETHYSMOGRAPHIC APPARATUS
Stepan Figar, Prague, Czechoslovakia, assignor to Ceskoslovenska akademie ved, Prague, Czechoslovakia
Filed Aug. 4, 1965, Ser. No. 477,136
Claims priority, application Czechoslovakia, Nov. 24, 1964, 6,517/64
17 Claims. (Cl. 128—2)

ABSTRACT OF THE DISCLOSURE

In an apparatus for taking plethysmographic measurements on body parts, volume changes of a body part are detected by changes in an electrical circuit. There is a tubular casing consisting of two tubular elements which are secured to each other, and an annular insulating member within an end portion of each of the two tubular elements. The insulating members support tubular electrode means in a coaxial and spaced relationship with respect to the inner face of the casing. Conductive means connect the electrode means to a measuring circuit. The body part to be measured is inserted in a passage at least partly formed by the electrode means. The electrical circuit includes a capacitor whose two conductive surfaces are constituted by the body part and the electrode.

---

This invention relates to plethysmographic apparatus, and particularly to plethysmographic apparatus in which the volume changes of a body part are detected by changes in an electrical circuit including a capacitor whose two conductive surfaces are provided by the body part and by an electrode, and whose dielectric is the ambient air.

In its more specific aspect, the invention is concerned with a sensing device which includes a tubular electrode and supporting structure for holding the electrode on a finger or similar body part which is received in a passage at least partly formed by the cavity of the tubular electrode.

An object of the invention is the provision of such a sensing device which is useful for taking plethysmographic measurements on fingers and like body parts which vary greatly in their dimensions.

Another object is the provision of a sensing device in which a grounded shield is held in a fixed spatial relationship to the electrode.

A further object is the provision of a sensing device which is effective to center the inserted body part within the electrode cavity, yet does not significantly deform the body part.

Yet another object is the provision of a sensing device which can easily be disassembled for cleaning or sterilizing of its parts, and may thereafter be assembled in a simple manner to restore the original spatial relationship of the parts.

An additional object is the provision of a sensing device which may be adjusted to dimensional properties of an inserted body part in such a manner that the capacitance of the electrode and of the body part is a function of the distance of these two conductive surfaces only, whereby readings of the associated measuring apparatus may be calibrated directly in units of said distance.

Other objects and many of the attendant advantages of this invention will be readily appreciated as the same is better understood by reference to the following detailed description of preferred embodiments when considered with the attached drawings in which:

FIG. 2 shows the device of FIG. 1 in front elevation;

FIG. 3 shows a modified electrode for use in the device of FIG. 1 in a corresponding view;

FIG. 4 shows yet another modified electrode in side elevation;

FIGS. 5 and 6 show gages for measuring the spacing between the electrode in a sensing device of the invention and an inserted body part;

Figure 1:
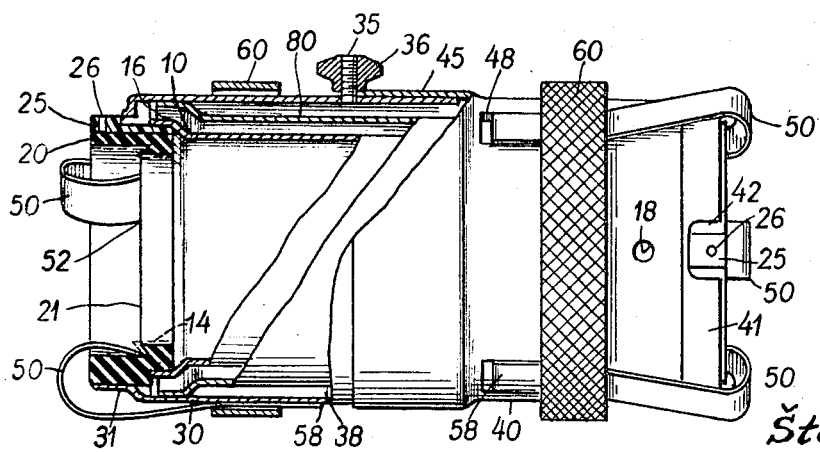
FIG. 1 shows a sensing device of the invention in side-elevation, and partly in section.

Referring now to the drawing in detail, and initially to FIGS. 1 and 2, there is seen a tubular casing consisting essentially of two tubular, cylindrical elements 30, 40. An axial end portion of the element 30 is conformingly received in an enlarged axial end portion 45 of the element 40, and the two elements are secured to each other against axial displacement and angular movement by a knurled nut 36 on a radially projecting threaded stud 35 fixedly fastened to the element 30. The nut 36 clamps the end portion 45 to the element 30.

The axial end portions 31, 41 of the two elements 30, 40 which are remote from each other are of reduced diameter and receive respective rubber rings 20 in engagement with the radially outward face of an axially outer rim portion of the received ring 20. The axially inner rim portion of the ring 20 is offset in a radially inward direction so as to form an internal shoulder 21. The cylindrical inner face portions of the ring 20 are metallized, and the conductive metal coating 14 is indicated by broken lines since it is too thin to permit realistic representation on the scale of the drawing.

Each metal coating 14 is grounded to the casing by three U-shaped spring metal clips 50. The outer leg 58 of each clip 50 engages the outer face of the corresponding metallic casing 30, 40 and its free end enters a recess 38, 48 in that face. The inner leg 52 abuts against the shoulder 21. The bight portion of the clip and part of the inner leg 52 may be shifted radially inward and outward of the axial passage of the sensing device by a knurled adjusting ring 60 which is axially slidable on the outer legs 58 of the three clips 50 which are associated with each casing element 30, 40.

A tubular shield 80 is conductively secured to the inner face of the casing elements 30, 40 by the resilience of its enlarged axial end portions which frictionally engage the inner faces of the casing elements.

The offset, axially inner portion of each insulating ring 20 is received in the enlarged terminal portion 16 of a tubular electrode 10, and thereby supports the electrode in coaxial spaced relationship to the shield 80 and the casing 30, 40. A contact lug 25 fixedly fastened to the ring 20 is partly interposed between the ring 20 and the terminal portion 16 of the electrode 10, and is held in conductive contact with the electrode by the resilience of the ring 20. Another portion of the lug projects radially outward into a notch 17, better seen in the showing of a similar electrode in FIG. 3, and thereby prevents relative rotation of the electrode and of the ring 20.

The electrode 10 is axially held in position within the casing by the pressure of the clips 50 against the shoulders 21 of the rings 20. A portion of each clip 25 radially aligned with a notch 42 in the reduced end portion of the casing element 30, 40 is formed with an opening 26 for a soldered connection with a lead, not itself shown, and connecting the electrode 10 with one input terminal of the electronic measuring circuit, known in itself, and not illustrated. The other input terminal of the measuring circuit is connected with the casing 30, 40 by a grounding connection through a non-illustrated conductive support, or by another lead that may be attached, for example, to the stud 35 and nut 36.

The casing elements 30, 40 have vent holes 18 of which only one has been shown, and which are aligned with corresponding holes in the shield 80 and the electrode 10 for adequate radial access of air to the central passage through the sensing device, thus avoiding the risk of moisture from an inserted finger condensing on the inner surfaces of the device. Spacers 19 of insulating material, not visible in FIGS. 1 and 2, but shown in the analogous electrode assembly of FIG. 3, project radially inward from the electrode and prevent direct contact between the electrode 10 and the inserted finger.

In operating the sensing device of FIGS. 1 and 2, a finger or similar body part is inserted into the passage through the casing 30, 40, and is attached to the sensing device by shifting the rings 60 so that the clips 50 move toward the axis of the device, thereby gripping the finger from three directions offset 120° from each other, and precisely centering the same. The clips also ground the finger to the casing 30, 40. Leads from a measuring instrument, which is basically a conductance measuring bridge, are then secured to the casing and to one of the lugs 25, and readings are taken in a manner known in itself. External electrical fields are prevented from influencing the results by the shields 14 and 80.

When measurements have been completed, the sensing device may be quickly taken apart by pulling off the clips 50, loosening the nut 36, and slipping the casing parts apart, whereby one of the rings 20 is slipped out of the associated casing element or the corresponding terminal portion of the electrode 10. The remainder of the device is then quickly disassembled into its component elements without the use of tools and in an obvious manner. After cleaning and sterilizing, if so desired, the sensing device is readily assembled again, and the relative spatial relationship of all component parts is restored in a simple and foolproof manner.

The modified electrode assembly shown in FIG. 3 is intended to replace the electrode 10 in the apparatus shown in FIG. 1. It has two separate axial electrode members 11, 12 which are identical with corresponding axial portions of the electrode 10 and with each other. They are connected by a ring 13 of insulating material so that they form a mechanical unit, but permit two sets of measurements to be taken simultaneously on spaced portions of the same finger. The vent holes 18 have been omitted from the showing of FIG. 3, but are preferably provided in as great a number as is consistent with the desired mechanical rigidity of the several tubular components.

An additional electrode for use with other elements of the sensing device shown in FIG. 1 is illustrated in FIG. 4. Its axially terminal enlarged portions 16 are identical with those of the electrode 10, and equipped with notches 17 for receiving the contact lugs 25 whereby the two terminal portions may respectively be secured against rotation relative to the casing elements 30, 40 in the manner described above. The central portion 15 of the electrode is helically slotted so that the remaining metal defines a cylinder whose diameter can be varied by turning the two terminal portions 16 relative to each other about their common axis while maintaining their axial spacing.

Such expansion or contraction of the electrode is readily brought about in the device of FIG. 1 when equipped with the electrode of FIG. 4 by loosening the nut 36, and thereafter turning the casing elements 30, 40 relative to each other. The sensing device may therefore be adjusted to a standardized radial spacing between the inserted finger and the electrode surface prior to measurement even when the fingers tested vary appreciably in thickness.

Gages for ascertaining proper electrode diameter are illustrated in FIGS. 5 and 6. Each consists of a slender cylindrical rod 70 of insulating plastic whose two ends carry coaxial metal probes. The probes 71, 71', 72 are metal pins which vary in length, the probe 72' is a cone with rounded tip. The gages are inserted through a vent hole 18 in a casing 30, 40 and the shield 80 until the radial end face of the rod 70 abuts against the outer face of the electrode portion 15 and the probe penetrates the helical slot. The gage is then shifted laterally until the probe makes contact with the electrode portion 15. If the electrode is too close to the inserted finger, the probe forms a short circuit between finger and electrode which is readily detected by the measuring circuit.

The circuit may be directly calibrated in units of distance between finger and electrode regardless of finger thickness if the electrode is initially set to a predetermined distance by means of one of the gages shown in FIGS. 5 and 6. The preferred initial setting is that at which contact between finger and electrode is barely lost during expansion of the helical electrode portion 15, when the casing portions 30, 40 are turned relative to each other. This setting is then secured by means of the nut 36.

Figure 7:
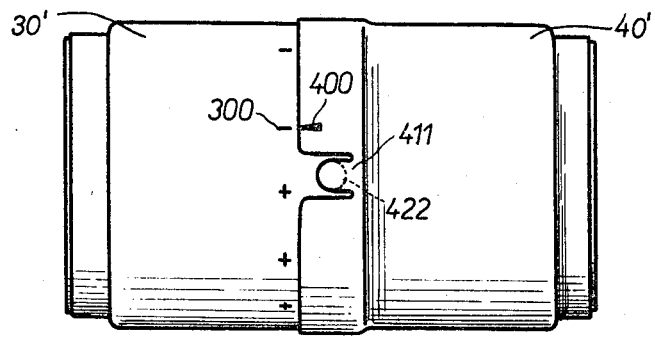
FIG. 7 is a side-elevational view of a modified casing for a sensing device of the invention.
Figure 8:
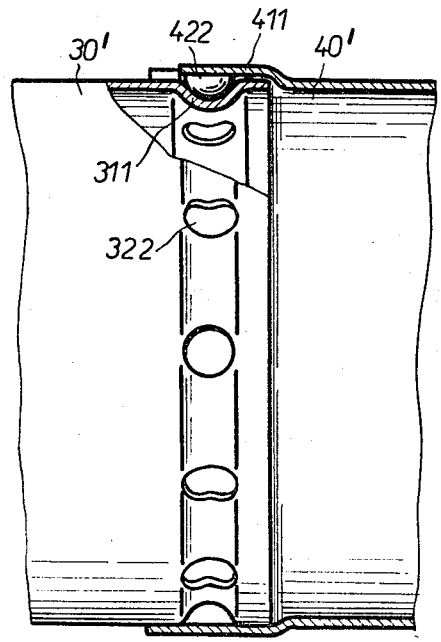
FIG. 8 shows a detail of the apparatus of FIG. 7 on an enlarged scale and in section.

The modified casing shown in FIGS. 7 and 8 is particularly convenient for use with the electrode illustrated in FIG. 4. The enlarged inner axial end portion of the casing element 40' is partly cut away to leave an integral resilient tongue 411 which carries a hemispherical click 422 on its inner face. The end portion of the other casing element 30' which is received in the end portion of the casing element 40' has an annular groove 311 dimensioned partly to receive the click 422. Openings 322 are provided at uniform distances in the bottom of the groove 311 and are entered by the click 422 under the resilience of the tongue 411 when the casing elements are turned relative to each other, thus providing a series of releasable stops each of which is entered with an audible signal. A gage mark 400 on the casing element 40' and a scale 300 on the element 300 further provide visible indicia of the relative angular position of the elements, thereby permitting an approximate preliminary setting of the effective electrode diameter, and reserving the use of the gages shown in FIGS. 5 and 6 to the fine adjustment of the electrode. It will be understood that the casing elements 30', 40' are identical with the elements 30, 40 in all aspects not described in detail hereinabove, and also are formed with vent holes 18 in a manner not illustrated for the sake of clarity.

If the thickness of a finger is determined by calipers or the like prior to insertion in the sensing device, the casing elements 30', 40' permit adjustment of the instrument for proper initial spacing between finger and electrode without the use of gages.

Obviously, many modifications and variations of the present invention are possible in the light of the above teachings. It is therefore to be understood that, within the scope of the appended claims, the invention may be practiced otherwire than as specifically disclosed.

What is claimed is:
1. In a sensing device for plethysmographic tests, in combination:
 (a) a tubular casing including
  (1) two tubualr elements and
  (2) fastening means for securing said elements to each other in coaxial, axially offset relationship,
  (3) each element having an axial end portion remote from the corresponding portion of the other elements;
 (b) an annular insulating member secured in each of said end portions;
 (c) tubular electrode means received in said casing, said electrode means being fastened to said insulating members and spaced thereby from said casing, and defining an axial passage extending through said casing; and
 (d) conductive means for electrically connecting said electrode means to a measuring circuit.

2. In a device as set forth in claim 1, said conductive means including a conductor interposed between said insulating member and said electrode means, said insulating member being of resilient material, and said conductor being urged into contact with said electrode means by the resilience of said insulating member.

3. In a device as set forth in claim 2, said conductor being fixedly fastened to said insulating member for movement therewith relative to said electrode means.

4. In a device as set forth in claim 1, a plurality of clip members of electrically conductive resilient material, each clip member being substantially U-shaped and having two leg portions, one leg portion abuttingly engaging an outer face of said casing, and the other leg portion abuttingly engaging an inner face of one of said insulating members.

5. In a device as set forth in claim 4, adjusting means on said casing for varying the radial position of said other leg portion toward and away from a position in which said leg portion radially projects into said passage.

6. In a device as set forth in claim 1, a plurality of spacers of insulating materials radially projecting from said electrode means into said passage.

7. In a device as set forth in claim 1, said electrode means including two tubualr electrode members and insulating means connecting said electrode members in coaxial relationship.

8. In a device as set forth in claim 1, said electrode means including a tubular member having two axially terminal portions respectively secured to said axial end portions of said elements by said insulating members, and a central portion, said central portion being formed with a helical slot, whereby relative angular movement of said terminal portions about said axis causes radial expansion and contraction of said central portion.

9. In a device as set forth in claim 8, engaged means on said insulating members and on said terminal portions for preventing relative angular movement of each terminal portion and the associated insulating member.

10. In a device as set forth in claim 9, said tubular elements being rotatable relative to each other about said axis, and releasable means for arresting relative rotation of said elements in a plurality of angularly spaced portions.

11. In a device as set forth in claim 9, said tubular elements being rotatable relative to each other about said axis, and indicia means on each of said tubular elements for indicating the relative angular position thereof.

12. In a device as set forth in claim 1, said insulating member having an exposed, axially extending, annular face about said axis, and a conductive coating on said face.

13. In a device as set forth in claim 12, conductive means connecting said coating to said casing, the casing being of conductive material.

14. In a device as set forth in claim 1, each of said insulating members having an outer annular rim portion and inner annular rim portion axially spaced from said outer portion in a direction inward of said passage, said outer rim portion having a radially outward face engaging said casing, and said inner rim portion having a radially outward face spaced from said casing toward said axis and engaging said electrode means.

15. In a device as set forth in claim 1, guide means for guiding a finger and the like into said passage, and for holding the finger in said passage in spaced relationship to said electrode means.

16. In a device as set forth in claim 15, gage means insertable into said passage for gaging the spacing of said inserted finger and the like and of said electrode means.

17. In a device as set forth in claim 16, said casing being formed with a radial aperture therethrough for insertion of said gage means.

References Cited

UNITED STATES PATENTS

| | | | |
|---|---|---|---|
| 3,207,151 | 9/1965 | Takagi | 128—2.1 |
| 3,299,882 | 1/1967 | Masino | 128—2.05 |
| 3,334,623 | 8/1967 | Hillier et al. | 128—2.05 |

RICHARD A. GAUDET, *Primary Examiner.*

S. BRODER, *Assistant Examiner.*